United States Patent

[11] 3,551,693

[72] Inventors Joseph R. Burns
Trenton;
John James Gibson, Princeton, N.J.
[21] Appl. No. 852,993
[22] Filed Aug. 25, 1969
[45] Patented Dec. 29, 1970
[73] Assignee RCA Corporation
a corporation of Delaware
Continuation of application Ser. No. 513,396, Dec. 13, 1965, now abandoned.

[54] CLOCK LOGIC CIRCUITS
10 Claims, 7 Drawing Figs.

[52] U.S. Cl. .......... 307/205, 307/251, 307/279, 307/288
[51] Int. Cl. .......... H03k 19/08
[50] Field of Search .......... 307/205, 251, 255, 279, 288; 328/202

[56] References Cited
UNITED STATES PATENTS

| | | | |
|---|---|---|---|
| 3,089,963 | 5/1963 | Djorup | 307/255 |
| 3,252,011 | 5/1966 | Zuk | 307/205 |
| 3,292,008 | 12/1966 | Rapp | 307/251 |
| 3,311,751 | 3/1967 | Maestre | 307/288 |

*Primary Examiner*—John S. Heyman
*Attorney*—J. V. Regan

ABSTRACT: Clocked logic circuits employing only semiconductor devices. A plurality of semiconductor devices have their conduction paths connected in series across a pair of operating power terminals. At least one of the devices is driven by a clock signal and at least one other of the devices is driven by a data signal. The output signal is taken from a common connection of the conduction paths of the data and clock device conduction paths.

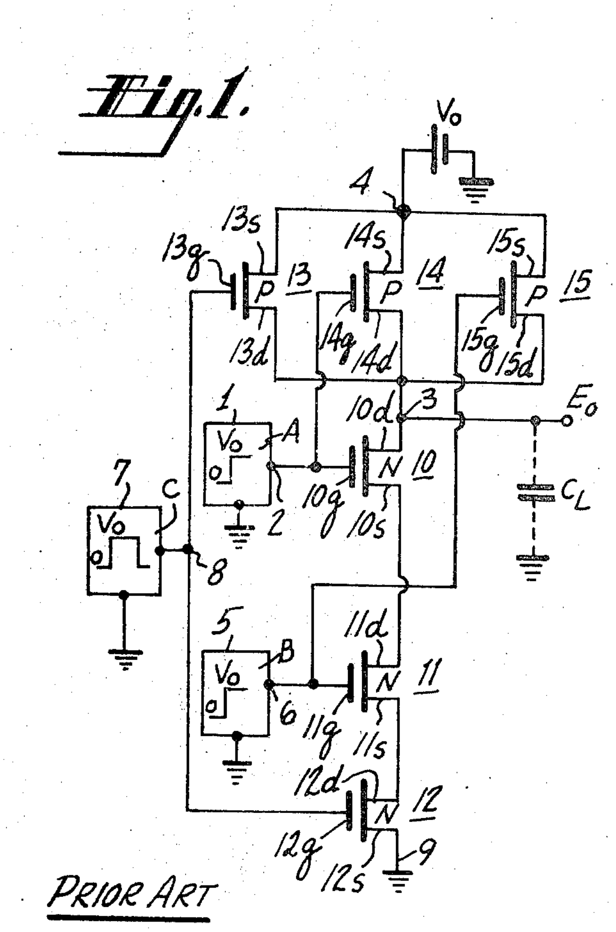
FIG. 1
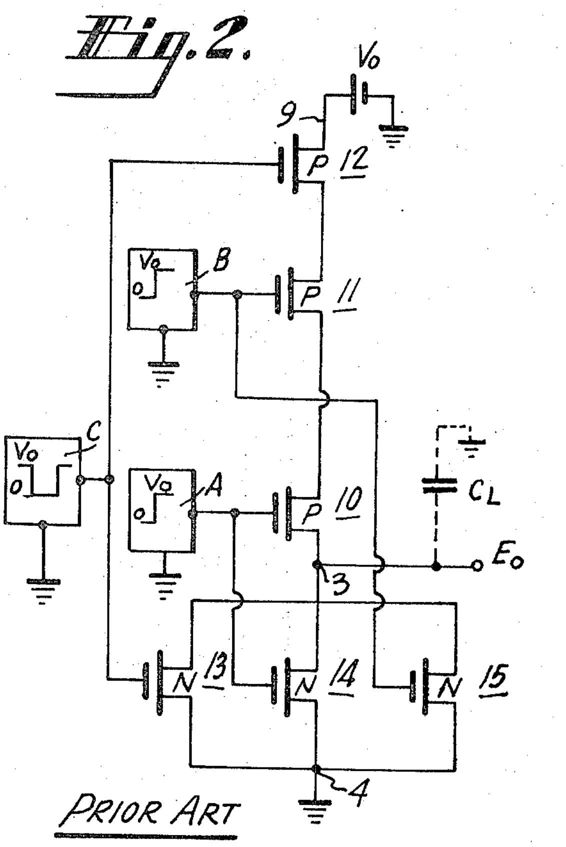
FIG. 2
| C | A | B | E0 |
|---|---|---|---|
| L | L | L | H |
| L | H | L | H |
| L | L | H | H |
| L | H | H | H |
| H | L | L | H |
| H | L | H | H |
| H | H | L | H |
| H | H | H | L |
FIG. 3
| C | A | B | E0 |
|---|---|---|---|
| H | L | L | L |
| H | L | H | L |
| H | H | L | L |
| H | H | H | L |
| L | H | H | L |
| L | H | L | L |
| L | L | H | L |
| L | L | L | H |
FIG. 4
INVENTORS
JOSEPH R. BURNS &
JOHN JAMES GIBSON
BY John V. Regan
ATTORNEY INVENTORS
JOSEPH R. BURNS &
JOHN JAMES GIBSON
BY John V. Regan
ATTORNEY

CLOCK LOGIC CIRCUITS

This case is a continuation of 513,396 filed Dec. 13, 1965, now abandoned.

This invention relates to logic circuits and in particular to logic circuits which utilize active semiconductor devices.

While logic circuits have varied applications, they are used extensively in switching and computer apparatus for the internal routing of information. Such information in the form of electrical signals is generally guided through desired circuit paths by means of elemental logic circuitry. Due to the large number of logic circuits required in a computer equipment, the wiring and interconnections between the logic circuits is rather complex and costly. Even when the logic circuits are fabricated as integrated circuit structures, the interconnection problem still exists as between separate integrated structures. It is desirable therefore to fabricate as many logic gates as possible in a single integrated circuit structure.

An object of this invention is to provide novel and improved logic circuitry.

Another object of this invention is to provide novel logic circuitry requiring relatively few semiconductor devices.

Logic circuit arrangements according to this invention utilize a plurality of semiconductor devices each having a conduction path and a control electrode for controlling the conduction of the path. A clock terminal is coupled to the control electrode of at least a first one of the devices and a data terminal is coupled to the control electrode of a second one of the devices. The conduction paths of the first and second devices are connected in series across first and second operating power terminal means. A circuit output terminal is coupled to the common junction of the conduction path of the first and second devices.

In one embodiment, the clock terminal is also coupled to the control electrode of a third one of the semiconductor devices which also has its conduction path connected in series with the conduction path of the other two devices across the pair of operating power terminal means. The first semiconductor device is of one conductivity type and the second and third devices are of the opposite conductivity type.

In the accompanying drawing, like reference characters denote like components and:

FIGS. 1 and 2 are schematic diagrams of known logic circuits;

FIGS. 3 and 4 are "truth" tables for the logic circuits of FIGS. 1 and 2, respectively;

Figure 5:
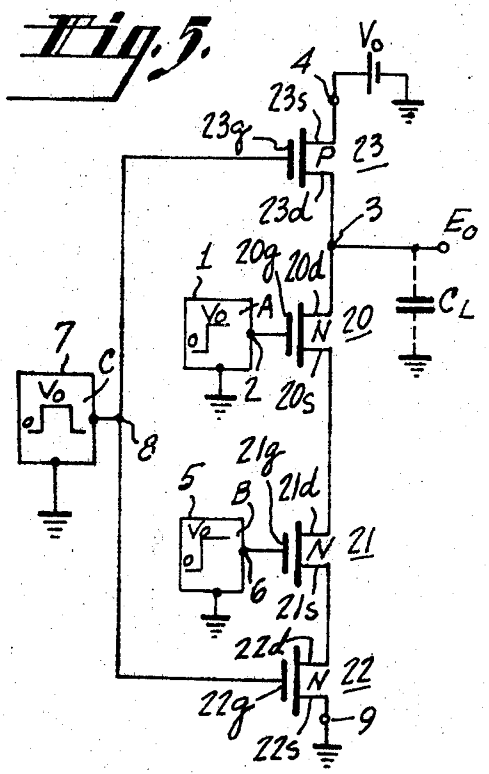
FIGS. 5 and 6 are schematic diagrams of logic circuits which embody the present invention.

The active semiconductor devices contemplated for use in practicing the invention have a pair of spaced apart electrodes defining a conduction path therebetween and a control electrode means for controlling the conductivity of the path. The semiconductor devices preferably are insulated-gate field-effect transistors, in which case the pair of electrodes defining the conduction path are the source and drain electrodes, and the control electrode means is a gate electrode means. Two known types of insulated-gate field-effect transistors are the thin-film transistor (TFT) and the metal oxide semiconductor (MOS). Some of the physical and operating characteristics of a thin-film transistor are described in an article by P. K. Weimer entitled, "The TFT–a New Thin-Film Transistor," appearing at pages 1462—1469 of the Jun. 1962 issue of the PROCEEDINGS OF THE IRE. The MOS transistor is described in an article entitled, "The Silicon Insulated-Gate Field-Effect transistor," by S. R. Hofstein and F. P. Heiman, appearing at pages 1190—1202 of the Sept. 1963 issue of the PROCEEDINGS OF THE IEEE.

Such transistors may be of either the enhancement type or the depletion type. The enhancement type unit is of particular interest in the present application. In an enhancement type unit, the impedance of the conduction channel is very high when the gate and source voltages have the same value. A signal of the proper polarity applied between the gate and source decreases the impedance of the conduction channel. In a depletion type unit, the impedance of the conduction path is relatively low when the source and gate have the same voltage. Input signals of the proper polarity applied between the source and drain increase the impedance of the conduction path.

An insulated-gate field-effect transistor may be either a P-type or an N-type unit depending upon the conductivity type material of the semiconductive body. A P-type unit is one in which the majority carriers are holes; whereas, an N-type unit is one in which the majority carriers are electrons.

The logic circuits illustrated in FIGS. 1 and 2 are described in an article entitled, "Switching Response of Complementary-Symmetry MOS Transistor Logic Circuits" appearing in the RCA Review for Dec. 1964, at pages 627—661. The logic circuit in FIG. 1 includes a plurality of N-type transistors 10, 11 and 12 and a like plurality of P-type transistors 13, 14 and 15. The N-type transistors have their conduction paths connected in series circuit between an output circuit point 3 and a circuit point 9. The circuit point 9 is further connected to circuit ground as illustrated by the conventional symbol. To this end, the source electrode 12*s* is connected at point 9 to circuit ground; the drain electrode 12*d*, to the source electrode 11*s*; the drain electrode 11*d*, to the source electrode 10*s*; and the drain electrode 10*d* to the output circuit point 3.

The conduction channels of the P-type transistors are connected in parallel between the output circuit point 3 and another circuit point 4. The circuit point 4 is further connected to the positive terminal of a source of operating potential, illustrated as a battery $V_o$ having its negative terminal connected to circuit ground. To this end, the source electrodes 13*s*, 14*s* and 15*s* are connected to the circuit point 4; while drain electrodes 13*d*, 14*d* and 15*d* are connected to the output circuit point 3.

The gate or control electrodes 12*g* and 13*g* are connected in common to a terminal 8 of a source 7 of digital signals. The other terminal of the digital signal source 7 is connected to circuit ground. The gate electrodes 11*g* and 15*g* are connected in common to a terminal 6 of another source 5 of digital signals. The other terminal of the digital signal source 5 is connected to ground. The gate electrodes 10*g* and 14*g* are connected in common to a terminal 2 of a further source 1 of digital signals, the other terminal of which is connected to circuit ground.

The digital signal sources 1, 5 and 7 include suitable digital circuitry capable of developing at their outputs digital signals A, B and C, respectively, which have either a low- or high-voltage level. In an exemplary digital system, the higher digital level may have a value of $+V_o$ volts, and a lower digital level may have a value of 0 volt.

The output circuit point 3 is further connected to a load capacitance $C_L$ as illustrated by the dashed connections in FIG. 1. The load capacitance $C_L$ is representative of the sum total of the input capacitance of other transistors which the logic circuit is driving.

In steady state operation, if any one or more of the digital signals A, B or C is at the relatively low-voltage level, of 0 volt, the gate-to-source voltage of the associated N-type transistor or transistors is substantially 0 volt, thereby biasing the associated N-type transistor or transistors into cutoff. Thus, for this signal conduction, the conduction path of the cutoff N-type transistor or transistors presents a relatively large impedance in the circuit path between the output circuit point 3 and circuit ground. Also for this signal condition of one or more of the digital signals A, B or C being at the low level of 0 volt, the gate-to-source voltage of the associated P-type transistor or transistors is substantially $-V_o$ volts. The associated P-type transistor or transistors is or are thereby biased on. The load capacitance $C_L$ is therefore charged to substantially $+V_o$ volts.

When all of the digital signals A, B and C are at the relatively high level of $+V_o$ volts, the gate-to-source voltages of the N-type transistors 10, 11 and 12 are $+V_o$ volts; while the gate-to-source voltages of the P-type transistors 13, 14 and 15 are 0 volt. All of the N-type transistors are therefore biased on, while the P-type transistors are biased into cutoff. With all the N-type transistors on, the circuit path between the output circuit point 3 and circuit ground presents very little impedance so that the load capacitance $C_L$ has a charge of substantially 0 volt.

The "truth" table in FIG. 3 summarizes this circuit operation. The letters L and H are symbolic of the relatively low- and high-voltage levels, respectively. According to the preceding description and to the "truth" table of FIG. 3, the output signal $E_o$ is at a low-voltage level only when all of the input signals A, B and C are at a relatively high-voltage level and the output signal $E_o$ is at a relatively high-voltage level when any one or more of the input signals A, B or C is at a relatively low-voltage level. If the binary symbols 1 and 0 are assigned to the higher and lower levels, respectively, the logic circuit in FIG. 1 can be said to function as a NAND gate. On the other hand, if the binary signal 1 and 0 are assigned to the lower and higher levels, respectively, the logic circuit functions as a NOR gate.

The logic circuit of FIG. 2 is similar to the logic circuit of FIG. 1, differing therefrom in the following respects. The transistors 10, 11 and 12 are P-type instead of N-type transistors; while the transistors 13, 14 and 15 are N-type instead of P-type transistors. The connection of the battery $V_o$ is changed so that its positive terminal is connected to the circuit point 9 and its negative terminal is connected to circuit ground. The circuit point 4 is also connected to circuit ground.

When any one or more of the digital signals A, B or C is at the relatively high-voltage level of $+V_o$ volts, the associated P-type transistor or transistors is biased into cutoff such that the circuit path between the circuit points 3 and 9 presents a relatively large impedance. On the other hand, the associated N-type transistor or transistors is or are biased on. Consequently, the load capacitance has a charge of substantially 0 volt.

When all of the digital signals A, B and C are at the lower digital level of 0 volt, all of the N-type transistors are biased into cutoff. All of the P-type transistors are biased on so that the circuit path between the circuit points 3 and 9 presents a very small impedance. The load capacitance $C_L$ is charged to substantially $+V_o$ volts.

The "truth" table in FIG. 4 summarizes this circuit operation. According to the preceding description of the FIG. 2 circuit and to the "truth" table in FIG. 4, the output signal $E_o$ is at a relatively high-voltage level only when all of the digital signals A, B and C are at relatively low-voltage levels; and the output signal $E_o$ is at a relatively low-voltage level when any one or more of the signals A, B or C is at a relatively high-voltage level. If the binary symbols 1 and 0 are assigned to the relatively high- and low-voltage levels, respectively, the FIG. 2 logic circuit functions as a NOR gate. On the other hand, if the binary symbols 1 and 0 are assigned to the relatively low- and high-voltage levels, respectively, the logic circuit functions as a NAND gate.

Logic circuits of the type described in FIGS. 1 and 2 have the advantage of low standby power dissipation. Low power dissipation in the standby or steady state condition is achieved primarily because when a P-type transistor is conducting, the N-type transistor associated therewith is nonconducting, and vice versa. Consequently, the load capacitance $C_L$ is charged to one of two digital voltage levels. A small amount of power dissipation does occur during the standby condition due to leakage between the source and drain of a cutoff transistor. However, the leakage current associated therewith is relatively small so that standby power dissipation is negligible.

Although the FIGS. 1 and 2 logic circuits have been illustrated with only 3 inputs, it is apparent from the aforementioned RCA Review article that there can be more inputs. Moreover, it should be mentioned that with slight modifications the logic circuits described in FIGS. 1 and 2 can be made to perform logical operations other than the NAND and NOR functions. These modifications may be implemented by the connection of transistors of the same conductivity type as transistors 10 and 11 in any circuit and configuration which presents any desired combination of circuit paths from the circuit point 3 to the circuit point 9. However, for each additional transistor so connected, a further transistor of the same conductivity as transistors 13, 14 or 15 is required to be connected in parallel with the last named transistors. In general, the FIGS. 1 and 2 logic circuits require two transistors for each input. When logic circuits of this type are used in combined logic and storage systems to gate information into and out of storage circuits, a large number of transistors is required. For example, in an illustrative digital system, five inputs per logic gate are needed to decode a five place address; and 16 logic gates are needed for a 16 word memory. Thus, the total number of transistors required is 160. It is desirable to reduce the number of transistors required in the interest of small size, low power dissipation, low cost, and ease of fabrication. These factors are especially significant in integrated circuit structures.

The parallel connection of the P-type transistors in FIG. 1 and the N-type transistors in FIG. 2 load the output point 3 with the output capacitance of each of the parallel-connected transistors, resulting in relatively slow operating speeds. Thus, it is further desirable to reduce the number of transistors directly connected to the output point of the logic circuit.

The present invention provides a novel and improved logic circuit for use in clocked logic systems, as for example, in the decoder of an active memory wherein the words are addressed at some predetermined frequency. The logic circuit of the present invention requires only one transistor per logical input and two transistors for the clocked signal input, while retaining the benefit of low standby power dissipation. One of the two clock transistors may be common to a plurality of groups of logical input transistors. In addition, the number of transistors directly connected to the output terminal is small relative to the FIGS. 1 and 2 logic circuits.

The present invention is embodied in FIG. 5 as a logic circuit having a series circuit connected between the output circuit point 3 and the circuit point 4 to provide the sole circuit path therebetween and another circuit connected between the output circuit point 3 and the circuit point 9. Different operating potentials are connected to the circuit points 4 and 9. To this end, the battery $V_o$ applies a potential of $+V_o$ volts to the circuit point 4, while the circuit point 9 is connected to circuit ground.

The series circuit includes the conductive path of a P-type transistor 23. That is, the source electrode 23*s* is connected to the circuit point 4 and the drain electrode 23*d* is connected to the output circuit point 3.

The other circuit includes a series connection of the conductive paths of a group of N-type transistors 20, 21 and 22. That is, the drain electrode 20*d* is connected to the output circuit point 3; the source electrode 20*s*, to the drain electrode 21*d*; the source electrode 21*s*, to the drain electrode 22*d*; and the source electrode 22*s*, to the circuit point 9.

The control or gate electrodes 22*g* and 23*g* are connected in common to the terminal 8 of the digital signal source 7, the other terminal of which is connected to circuit ground. The digital signal source 7 represents a clock source in a clocked digital system capable of generating at its terminal 8 a clock signal C at some predetermined frequency. The gate electrode 20*g* is connected to the terminal 2 of the digital signal source 1, the other terminal of which is connected to circuit ground. The gate electrode 21*g* is connected to the terminal 6 of the digital signal source 5, the other terminal of which is connected to ground. The digital signal sources 1 and 5 represent logical signal sources and generate at their terminal 2 and 6 the digital signal levels A and B, respectively.

In operation, the clock source 7 generates a recurring positive going signal. During the periods between the positive going signals, the signal level C is at the relatively low digital level of 0 volt. The gate-to-source voltage of the N-type transistor 22 then is 0 volt, thereby biasing transistor 22 into cutoff. The conductive path of transistor 22 therefore presents a relatively large impedance in the circuit path between the output circuit point 3 and ground. On the other hand, the gate-to-source voltage of the P-type transistor 23 is $-V_o$ volts, thereby biasing the P-type transistor on. The conductive path of the transistor 23 therefore presents a relatively small impedance between the circuit points 3 and 4. Thus, the load capacitance is charged to substantially $+V_o$ volts. The load capacitance has a charge of $+V_o$ volts regardless of the digital signal level condition of the signal A or B due to the large impedance presented by the conduction path of the cutoff transistor 22.

When the clock signal C goes positive to the relatively high value of $+V_o$ volts, the transistor 22 is biased on and transistor 23 is biased into cutoff. The conduction path of the N-type transistor 22 therefore presents a relatively small impedance in the circuit path between output circuit point 3 and ground; while the conduction path of the transistor 23 presents a relatively large impedance between the circuit points 3 and 4.

If either one or both of the digital signals A or B is at the lower digital level of 0 volt, the associated N-type transistor is biased into cutoff, thereby presenting a relatively large impedance in the circuit path between output circuit point 3 and ground. Since the leakage of the conduction path of a cutoff transistor has a long time constant relative to the duration of the clock signal, the load capacitance remains charged to substantially $+V_o$ volts.

On the other hand, if both of the digital signals A and B are at the higher digital level of $+V_o$ volts, the N-type transistors 20 and 21 are both biased into conduction, whereby their conduction paths present relatively small impedances between the output 3 and ground. The output signal $E_o$ therefore falls to the lower digital level of substantially 0 volt. When the clock signal returns to the lower digital level of 0 volt, the N-type transistor 22 becomes cutoff and the P-type transistor 23 is biased into conduction. The load capacitance $C_L$ becomes charged to the higher digital level of $+V_o$ volts.

To summarize, the output signal $E_o$ is at the lower digital level only when all of the digital signals A, B and C are at the higher digital level; and the output signal $E_o$ is at the higher digital level when any one or more of the digital signals A, B and C is at the lower digital level. Thus, the logic circuit embodied in FIG. 5 performs a logical NAND or NOR function like the illustrated logic circuit in FIG. 1. The "truth" table in FIG. 3 is therefore descriptive of the clock logic circuit embodied in FIG. 5.

Figure 6:
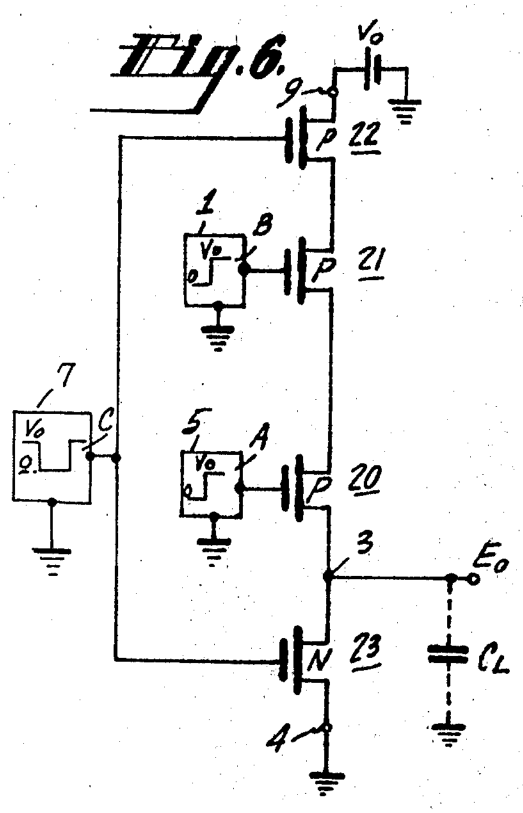

The logic circuit embodied in FIG. 6 is similar to the embodiment of FIG. 5, differing therefrom in the following respects. The transistors 20, 21 and 22 are P-type instead of N-type, while the transistor 23 is an N-type instead of a P-type transistor. The connections of the battery $V_o$ are changed so that its positive terminal is connected to the circuit point 9 and its negative terminal is connected to the circuit point 4 at circuit ground.

In operation, the clock source 7 generates a recurring negative going signal. In the periods between the negative going signals, the signal level C is at the relatively higher digital level of $+V_o$ volts. The P-type transistor 22 then is biased into cutoff. The conductive path of transistor 22 therefore presents a relatively large impedance between the output 3 and the battery $V_o$. On the other hand, the N-type transistor 23 is biased on. The conduction path of transistor 23 presents a relatively small impedance between the circuit points 3 and 4. Consequently, the load capacitance has a charge of substantially 0 volt. The load capacitance has a charge of 0 volt regardless of the signal condition of the signals A or B, due to the large impedance of the conduction path of the cutoff transistor 22.

When the clock signal C falls to the lower digital level of 0 volt, the P-type transistor 22 becomes biased on. The conduction path of transistor 22 therefore presents a relatively small impedance between the output 3 and the battery $V_o$. On the other hand, the N-type transistor 23 is biased into cutoff. The conduction path of transistor 23 therefore presents a relatively large impedance between circuit points 3 and 4.

If either one or both of the signals A or B is at the higher digital level of $+V_o$ volts, the associated transistor is biased into cutoff whereby its conduction path presents a relatively large impedance between the output 3 and the battery $V_o$. The load capacitance $C_L$ retains a charge of substantially 0 volt. If both of the digital signals A and B are at the lower digital level of 0 volt, both transistors 20 and 21 are biased into conduction so that their conductive paths present relatively small impedance between the output 3 and ground. The load capacitance charges to substantially $+V_o$ volts.

When the clock signal returns to the higher digital level of $V_o$ volts, the P-type transistor 22 becomes cutoff and the N-type transistor 23 is biased on. The load capacitance then has a charge of substantially 0 volt.

To summarize, the output signal $E_o$ is at the higher digital level only when all of the digital signals A, B and C are at the lower digital level; and the output signal $E_o$ is at the lower digital level when any one or more of the digital signals A, B and C is at the higher digital level. Consequently, the logic circuit embodied in FIG. 6 performs the NOR or the NAND function like the FIG. 2 logic circuit. The "truth" table of FIG. 4 is therefore descriptive of the logic circuit embodied in FIG. 6.

It is apparent that additional inputs may be utilized in the logic circuits of FIGS. 5 and 6 by connecting the conduction paths of additional semiconductor devices in series with the conduction paths of transistors 20 and 21. The additional semiconductor devices would be N-type conductivity for FIG. 5 embodiment and P-type conductivity for the FIG. 6 embodiment.

Like the logic circuits described in FIGS. 1 and 2, the logic circuits embodied in FIGS. 5 and 6 can be made to perform other logic operations by the connection of transistors of the same conductivity type as transistors 20 and 21 in circuit configurations which yield any desired combination of circuit paths from the circuit point 3 to the drain electrode 22*d* of the clock transistor 22. Unlike the FIG. 1 and FIG. 2 logic circuits, further transistors of the same conductivity as transistor 23 are unnecessary.

Figure 7:
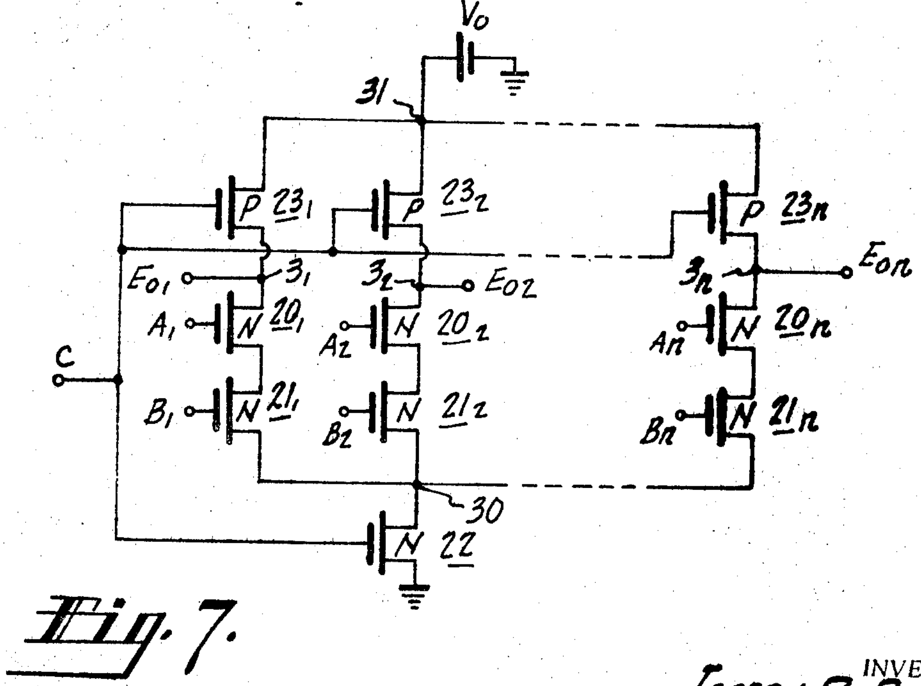
FIG. 7 is a schematic diagram of a circuit arrangement of a plurality of logic gates which utilize a common clock transistor.

Either the embodiment of FIG. 5 or FIG. 6 can be connected in a logical system wherein the clock signal C is applied in common to a plurality of logic gates. By way of example, the embodiment of FIG. 5 is employed to illustrate the arrangement in FIG. 7. The arrangement in FIG. 7 includes *n* groups of logic input transistors of N-type conductivity. The first group includes transistors $20_1$ and $21_1$; the second group, transistors $20_2$ and $21_2$; and the $n^{th}$ group, $20_n$ and $21_n$. P-type clock transistors $23_1$, $23_2$, ..., and $23_n$ are associated with each group of N-type transistors. An N-type clock transistor 22 is common to each of the *n* groups. To this end, the source electrodes of the transistors $21_1$, $21_2$, ..., and $21_n$ are connected in common at the circuit point 30 to the drain electrode of the clock transistor 22. The source electrode of the clock transistor 22 is connected to circuit ground. The source electrodes of the transistors $23_1$, $23_2$, ..., and $23_n$ are connected in common at the circuit point 31 to the positive terminal of the battery $V_o$.

A clock signal C is applied to the gate electrode of the clock transistor 22 and in common to the gate electrodes of the clock transistors $23_1$, $23_2$, ..., and $23_n$. Individual logic signals $A_1$, $A_2$, ..., and $A_n$ are applied to separate ones of the gate electrodes of the transistors $20_1$, $20_2$, ..., and $20_n$. Individual logic signals $B_1$, $B_2$, ..., and $B_n$ are applied to separate ones of the gate electrodes of the transistors $21_1$, $21_2$, ..., and $21_n$. Output signals $E_{01}$, $E_{02}$, ..., and $E_{0n}$ are derived from the output circuit points $3_1$, $3_2$, ..., and $3_n$.

Like the logic circuit embodied in FIG. 5, each group of N-type transistors 20 and 21 and its associated clock transistors are operable as a NAND gate for positive going signals or as a NOR gate for negative going signals in accordance with the "-truth" table of FIG. 3.

As mentioned previously, other logic operations can be achieved by the connection of transistors of the same conductivity as transistors 20 and 21 in any desired circuit configuration between the circuit point 3 and drain electrode of the clock transistor 22. By way of example, by connecting all of the output circuit points 3 in FIG. 7 together the following Boolean function is realized $$\overline{A_1B_1 + A_2B_2 + \ldots A_nB_n}.$$

Moreover, only one clock transistor 23 is required for the circuit arrangement.

There has been described logic circuits which require only one semiconductor device for each digital input signal and two semiconductor devices for a clock signal while retaining the advantage of low standby power dissipation. When the logic circuits are fabricated as integrated circuit structures, it is unnecessary that the transistors 20 and 21 have separate conduction paths. These transistors can be fabricated in a functional equivalent with a single source and a single drain electrode spaced apart to define a single conduction path. A plurality of separate gate electrodes can be provided so that each controls the conductivity of a portion only of the conduction path, the sum of the portions being equal to the whole conduction path.

We claim:

1. The combination comprising:

first and second power terminals and an output point;

a first switch means connected between said first power terminal and said output point, said first switch means providing the sole conduction path between said first power terminal and said output point;

a logic circuit having data input terminal means and first and second output terminals, said logic circuit assuming one of two states in response to input signals applied to said data input terminal means, and exhibiting in one of said states a relatively low value impedance between its output terminals and in its other state a relatively high value of impedance between its output terminals;

second switch means connected in series with said output terminals of said logic circuit said series circuit being connected between said output point and said second power terminal and means for applying an alternating clock signal having two parts per cycle to said first and second switch means for opening said first switch means and closing said second switch means during one part of each cycle and then closing said first switch means and opening said second switch means during the second part of each cycle.

2. The combination as claimed in claim 1, further including a capacitive load coupled to said output point.

3. The combination as claimed in claim 2, wherein said first and second switch means are insulated-gate field-effect transistors and wherein the logic circuit is also comprised of a plurality of field-effect transistors having their conduction paths connected in series.

4. The combination as claimed in claim 3, wherein said first switch means is an insulated-gate field-effect transistor of one conductivity type and said second switch means is an insulated-gate field-effect transistor of opposite conductivity type.

5. The combination comprising:

at least one input terminal for receiving a data input signal, a clock terminal for receiving clock signals, first and second power terminals for receiving operating power and an output terminal;

a plurality of semiconductor devices, each having a conduction path and a control electrode for controlling the conduction thereof;

means coupling the clock terminal to the control electrode of a first one and a third one of the devices, said first device being of first conductivity type and said third device being of second conductivity type, for enabling only one of said first and third devices at any one time;

means for coupling the data input terminal to the control electrode of a second one of the devices;

means coupling only one conduction path between said first power and output terminals comprising the conduction path of said first device for clamping the output to said first power terminal when said first device is enabled; and means coupling the conduction paths of the second and third devices in series between the output and second power terminals for connecting the conduction path of said second device between said output and second power terminals through a relatively low impedance when said third device is enabled.

6. The invention as claimed in claim 5 further including at least one other data input terminal;

means for coupling said other data input terminal to the control electrode of a fourth one of said devices; and wherein said conduction path coupling means couples the conduction path of the other data receiving device in series circuit with the conduction paths of said second and third devices.

7. The invention according to claim 6 wherein each of said semiconductor devices is an insulated-gate field-effect transistor having source and drain electrodes to define the associated conduction path and a gate electrode corresponding to the associated control electrode.

8. The invention according to claim 7 wherein said first device is of a first conductivity type and all the other devices are of a second conductivity type.

9. The combination comprising:

a multiplicity of input terminals for receiving data input signals, a clock terminal for receiving clock signals, first and second power terminals for receiving operating power, a junction point, and a plurality of output terminals;

a number of semiconductor devices of first conductivity type, each having a conduction path and a control electrode for controlling the conduction thereof;

means for coupling only one conduction path, each conduction path comprising the conduction path of one of said devices, between a different one of said output terminals and said first power terminal;

means for coupling a different conduction path, each conduction path comprising the conduction path of at least two transistors connected in series, between a different one of said output terminals and said junction point;

means coupling the conduction path of one of said devices between said junction point and said second power terminal;

means for coupling the clock terminal to the control electrodes of the devices coupling said output and first power terminals and to the control electrode of the device coupling said junction point and said second power terminal; and means for coupling a different one of said data input terminals to the control electrode of a different one of said devices coupled between said junction point and said output terminals.

10. The invention according to claim 9 wherein said devices coupling said output and first power terminal are of a first conductivity type and all the other devices are of a second conductivity type.